United States Patent [19]

Jacob

[11] 4,190,812
[45] Feb. 26, 1980

[54] LASER HEAD

[75] Inventor: Louis Jacob, Bretigny sur Orge, France

[73] Assignee: Compagnie Generale d'Electricite, Paris, France

[21] Appl. No.: 868,241

[22] Filed: Jan. 10, 1978

[30] Foreign Application Priority Data

Jan. 21, 1977 [FR] France ............................. 77 01704

[51] Int. Cl.² ............................................. H01S 3/09
[52] U.S. Cl. ............................................. 331/94.5 P
[58] Field of Search .................. 331/94.5 F, 94.5 P, 331/94.5 D; 330/4.3

[56] References Cited

U.S. PATENT DOCUMENTS 4,119,928  10/1978  Michon et al. .................. 331/94.5 F

*Primary Examiner*—William L. Sikes
*Attorney, Agent, or Firm*—Sughrue, Rothwell, Mion, Zinn and Macpeak

[57] ABSTRACT

A high-power laser head has a neodymium-doped glass rod as its active material and a source of light for exciting the glass rod to make it amplify laser radiation at 1.06 microns wavelength. The light source tends to illuminate the outer portions of the rod better than its axial zone thereby exciting the rod un-evenly. However, the outwardly directed light from the light source is collected by a spherical reflector and refocussed on a ruby laser which is aimed along the axial zone of the glass rod to increase its excitation in that zone and provide a more evenly excited glass rod. A mirror is placed between the glass rod and the ruby laser on the axis of the rod. The mirror reflects laser light at 1.06 microns wavelength but allows it to pass at the ruby wavelength.

12 Claims, 2 Drawing Figures

LASER HEAD

FIELD OF THE INVENTION

The present invention relates to a laser head.

BACKGROUND OF THE INVENTION

A laser head is a device comprising essentially an active laser material and means for exciting the material. A laser head amplifies a laser beam passing through its active material, and if a resonant optical cavity is disposed around the active material, the assembly becomes a laser generator.

A known amplifying laser head comprises active material in the form of a neodymium-doped glass rod and excitation means in the form of light discharge tubes disposed around the rod. When a high energy laser beam is to be amplified by the rod it is necessary for the rod to have a large cross-sectional area. This results in un-even excitation of the rod by the discharge tubes. The axial zone of the rod is less illuminated and its degree population inversion is less than that of the peripheral zone.

The present invention aims to mitigate this drawback and provide a high power laser structure in which the active material is more evenly excited.

SUMMARY OF THE INVENTION

The present invention provides a laser head comprising a neodymium-doped active glass rod.

a light source is disposed so that a part of the light emitted by this source illuminates the active material in order to make it capable of amplifying a laser beam at a wavelength of 1.06 microns passing through the material. The remaining part of the light does not illuminate the active material, and a portion of the active material is less illuminated than the rest.

At least one ruby crystal is disposed inside a resonant optical cavity which is coaxial with the rod.

A concave spherical reflector partially surrounds the rod and the crystal which are disposed substantially symetrically about the centre of the spherical reflector so that the crystal receives the remaining part of the light which does not illuminate the active material after reflection in the spherical reflector so as to produce laser radiation along the axis of the cavity.

Further, a plane mirror which reflects the laser beam and is transparent to the laser radiation of the ruby crystal is disposed between the rod and the ruby perpendicularly to the common axis of the rod and the ruby so as to allow the laser radiation to pass through the mirror to illuminate the less illuminated portion of the active material.

The invention also provides a laser head comprising an active material made of neodymium-doped glass.

A light source is disposed so that a part of the light emitted by this source illuminates the active material in order to make it capable of amplifying a laser beam at a wavelength of 1.06 microns passing through this material. The remaining part of the light does not illuminate the active material, and a portion of the active material is less illuminated than the rest.

Ruby crystals are each disposed inside a resonant optical cavity parallel to each other so as to constitute a bundle which is coaxial with the rod.

A concave spherical reflector partially surrounds the rod and the bundle of crystals which are disposed substantially symetrically about the centre of the spherical reflector so that the crystals receive the remaining part of the light which does not illuminate said active material so as to produce laser radiation along the axes of their cavities.

Further, a plane mirror which reflects the laser beam and is transparent to the laser radiation of the crystals is disposed between the rod and the ruby crystals, perpendicularly to the common axis of the rod and the bundle so as to allow the laser radiation to pass through the mirror to illuminate the less illuminated portion of the active material.

A detailed description of these various dispositions is given hereinbelow with reference to the accompanying drawings.

DESCRIPTION OF THE PREFERRED EMBODIMENT

Figure 1:
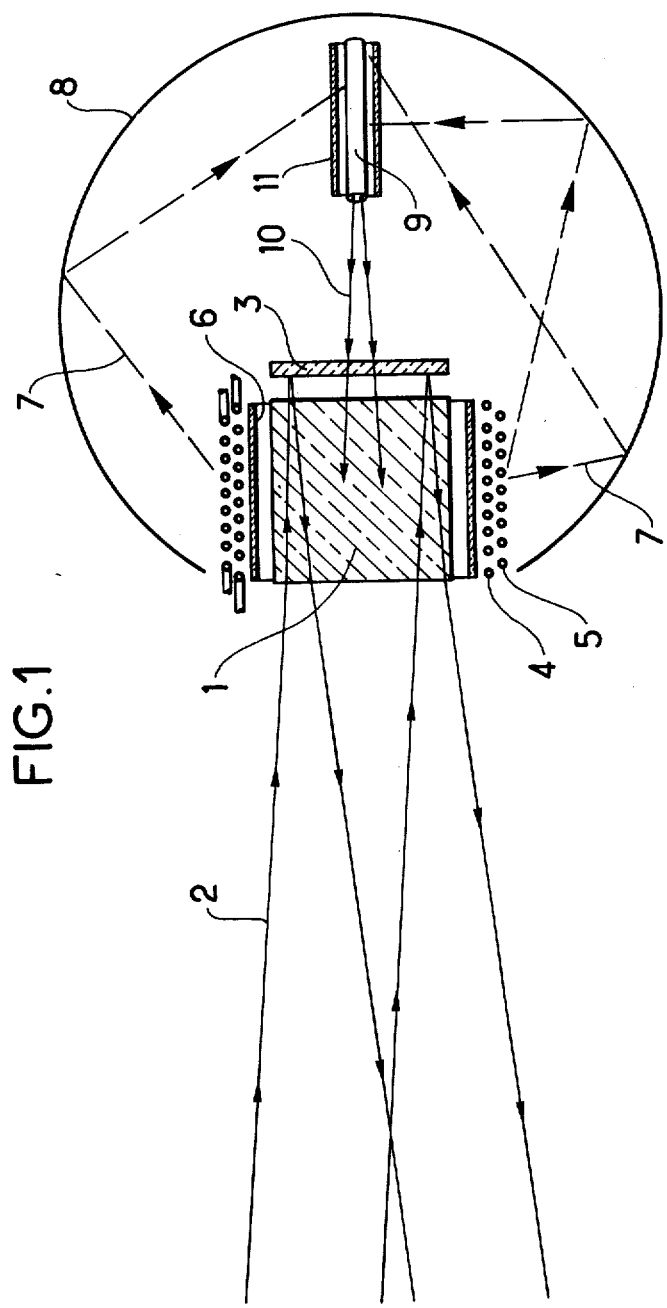
FIG. 1 is a longitudinal cross-section view of a laser head including a glass rod and one ruby.

The laser head shown in FIG. 1 comprises a neodymium-doped glass rod, having a cylindrical shape whose axis is in the plane of the figure. A light beam 2 having a wavelength of 1.06 microns and coming from a laser generator (not shown), passes through the rod along its axis. This beam is reflected on a mirror 3 in such a way that it passes through the rod twice.

Several discharge tubes of the helical type such as those referenced 4 and 5 connected to a source of energy, (not shown), are disposed around the cylindrical surface of the rod.

These tubes aim to excite the glass rod 1 by producing flashes of light, in order to amplify the laser beam 2.

A cladding tube (filter) 6 is disposed coaxially of the rod 1, between this rod and the discharge tubes. Such a cladding tube is used for eliminating the wavelengths which are detrimental to pumping the rod.

The light 7 which is emitted by the discharge tubes on the outside of the rod 1 is reflected by a spherical reflector 8 in the direction of a ruby rod 9 provided on its end surfaces with multidielectric layers forming an optical resonant cavity. This rod 9 is disposed coaxially with the rod 1 and symmetrically in relation to the centre of the hollow sphere constituting the reflector.

The ruby rod excited by the light which comes from the discharge tubes and suitably reflected by the reflector 8 is a laser beam 10 with a wavelength of 0.6943 microns; this beam 9 passes through the mirror 3 and enters the rod 1 in the zone close to the axis of this rod.

The additional excitation energy supplied improves the homogeneity of the pumping in the rod.

This ruby is advantageously surrounded by a cladding tube 11.

It must be understood that the mirror 3 is of a special type since it reflects the light 2 whose wavelength is 1.06 microns and transmits the light 10 whose wavelength is 0.6943 microns. The man in the art knows how to produce such mirrors which do not form a part of the present invention.

In a variant, the helical tubes 4,5 can be replaced by rectilinear discharge tubes disposed in parallel around the rod.

Figure 2:
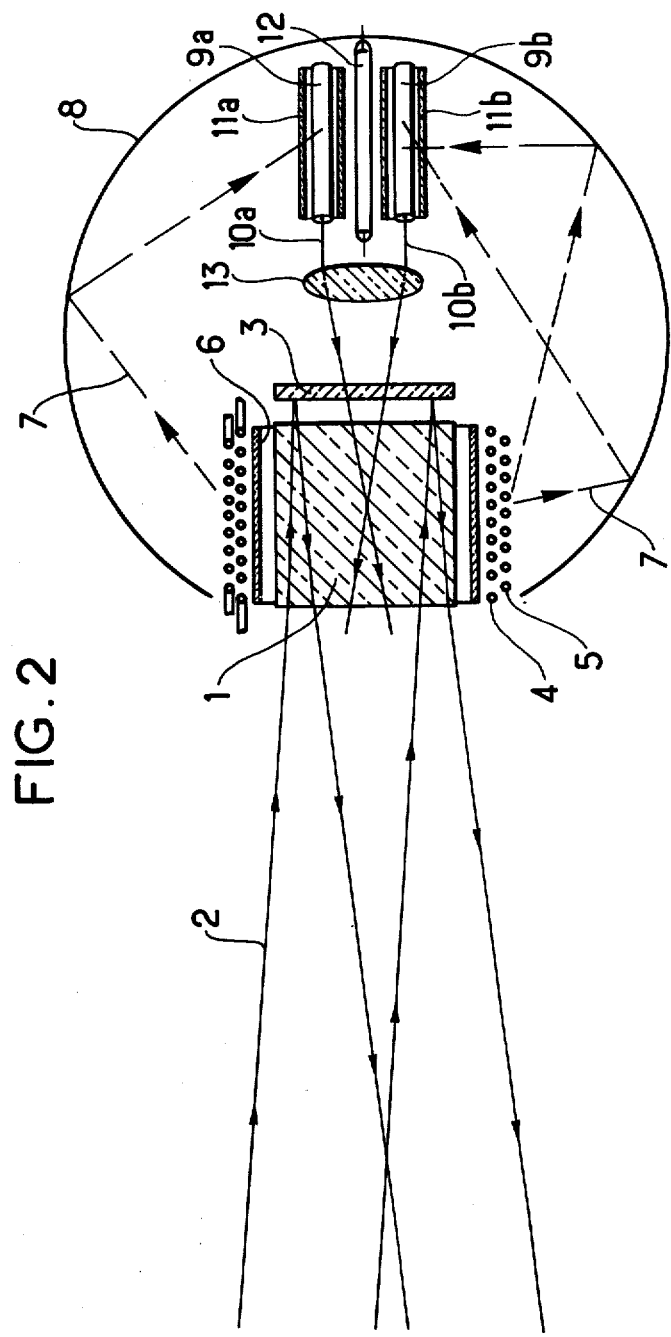
FIG. 2 is a longitudinal cross-section view of a laser head including a glass rod and a plurality of rubies.

FIG. 2 shows a longitudinal cross-section of a laser head in accordance with another embodiment. The units common to FIG. 1 and to FIG. 2 bear the same reference numerals. The embodiment of FIG. 2 differs from that of FIG. 1 in that there is not only one ruby, but several rubies 9a, 9b, etc. (six in all for example) disposed in a bundle coaxial to the rod 1.

Each ruby is provided preferably with a cladding tube 11a, 11b etc. A discharge tube 12 is preferably disposed on the axis of the bundle, so as to excite the rubies at the same times as the rays 7.

A lens 13 causes the laser beams 10a, 10b, etc. which come from the rubies to converge towards the central part of the rod 1.

The operation of the device is the same as that of FIG. 1.

In a variant, the helical discharge tubes can be replaced in the device of FIG. 2 by rectilinear discharge tubes disposed in a bundle round the rod 1.

The laser head described in the present application applies to a laser generator device.

What is claimed is:

1. A laser head comprising:
a neodymium-doped active glass rod;
a light source disposed with respect to said rod such that a part of the light emitted by this source illuminates the active material of said rod in order to render it capable of amplifying a laser beam at a wavelength of 1.06 microns passing through the material and the remaining part of the light does not illuminate the active material, a portion of the active material being less illuminated than the rest;
at least one ruby crystal disposed inside a resonant optical cavity, and being coaxial with the rod;
a concave spherical reflector partially surrounding the rod and the crystal, said rod and crystal being disposed substantially symetrically about the center of the spherical reflector such that the crystal receives said remaining part of the light which does not illuminate said active material after reflection in the spherical reflector to produce laser radiation along the axis of the cavity; and
a plane mirror which reflects the laser beam and is transparent to the laser radiation of the ruby crystal, said mirror being disposed between the rod and the ruby perpendicularly to the common axis of the rod and the ruby to allow said laser radiation to pass through the mirror to illuminate said less illuminated portion of the active material.

2. A laser head according to claim 1, wherein the light source comprises at least one helical discharge tube surrounding the rod.

3. A laser head according to claim 1, wherein the light source comprises a plurality of rectilinear discharge tubes disposed round the rod parallel to its axis.

4. A laser head according to claim 1, wherein a cladding tube is disposed coaxially with the rod, between the rod and the light source.

5. A laser head according to claim 1, wherein a cladding tube is disposed coaxially around the ruby crystal.

6. A laser head comprising:
an active material made of neodymium-doped glass;
a light source disposed relative to said glass such that a part of the light emitted by said source illuminates the active material of said glass to render it capable of amplifying a laser beam at a wavelength of 1.06 microns passing through this material, and with the remaining part of the light not illuminating the active material, a portion of the active material being less illuminated than the rest;
ruby crystals, each being disposed inside a resonant optical cavity parallel to each other, such that said crystals constitute a bundle which is coaxial with the rod;
a concave spherical reflector partially surrounding the rod and said bundle of crystals, with said crystals being disposed substantially symetrically about the center of the spherical reflector so that the crystals receive said remaining part of the light which does not illuminate said active material to produce laser radiation along the axes of their cavities; and
a plane mirror which reflects the laser beam and is transparent to the laser radiation of the crystals being disposed between the rod and the ruby crystals, perpendicularly to the common axis of the rod and the bundle to allow said laser radiation to pass through the mirror to illuminate said less illuminated portion of the active material.

7. A laser head according to claim 6, wherein a convergent optical device is disposed between the bundle and the rod so as to cause the laser radiation of the ruby crystals to converge towards the least illuminated portion of the rod.

8. A laser head according to claim 6, wherein a discharge tube is disposed in the axis of the bundle.

9. A laser head according to claim 6, wherein a cladding tube is disposed coaxially with the rod, between the rod and the light source.

10. A laser head according to claim 6 wherein each laser crystal is provided with a cladding tube disposed coaxially surrounding it.

11. A laser head according to claim 6 wherein the light source comprises at least one helical discharge tube surrounding the rod.

12. A laser head according to claim 6 wherein the light source comprises a plurality of rectilinear discharge tubes disposed around the rod, parallel to its axis.

* * * * *